(12) United States Patent
Kim et al.

(10) Patent No.: US 7,359,637 B2
(45) Date of Patent: Apr. 15, 2008

(54) SELF-HEALING PASSIVE OPTICAL NETWORK

(75) Inventors: Hyun-Soo Kim, Suwon-si (KR); In-Kwon Kang, Seoul (KR); Sung-Bum Park, Suwon-si (KR); Jae-Hoon Lee, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 516 days.

(21) Appl. No.: 10/901,274

(22) Filed: Jul. 28, 2004

(65) Prior Publication Data

US 2005/0135810 A1    Jun. 23, 2005

(30) Foreign Application Priority Data

Dec. 19, 2003    (KR) ............... 10-2003-0093864

(51) Int. Cl.
*H04J 14/00*    (2006.01)
(52) U.S. Cl. .............. 398/72; 398/7; 398/17; 398/67; 398/168
(58) Field of Classification Search .......... 398/17, 398/21–24, 66–72, 165, 167–168
See application file for complete search history.

(56) References Cited

U.S. PATENT DOCUMENTS

| | | | | |
|---|---|---|---|---|
| 5,521,734 A | * | 5/1996 | Frigo | 398/139 |
| 5,646,758 A | * | 7/1997 | Miki et al. | 398/100 |
| 5,790,293 A | * | 8/1998 | Frigo | 398/33 |
| 5,815,295 A | * | 9/1998 | Darcie et al. | 398/72 |
| 5,905,586 A | * | 5/1999 | Even | 398/1 |
| 5,936,753 A | * | 8/1999 | Ishikawa | 398/72 |
| 6,288,806 B1 | * | 9/2001 | Touma et al. | 398/5 |
| 6,512,610 B1 | * | 1/2003 | Minami et al. | 398/21 |
| 6,650,840 B2 | * | 11/2003 | Feldman | 398/21 |
| 6,868,232 B2 | * | 3/2005 | Eijk et al. | 398/5 |
| 6,915,075 B1 | * | 7/2005 | Oberg et al. | 398/9 |
| 6,975,812 B1 | * | 12/2005 | Kuhara et al. | 398/21 |
| 7,181,142 B1 | * | 2/2007 | Xu et al. | 398/66 |
| 2002/0021659 A1 | * | 2/2002 | Meijen et al. | 370/217 |
| 2003/0058505 A1 | * | 3/2003 | Arol et al. | 359/168 |

(Continued)

FOREIGN PATENT DOCUMENTS

JP    10-126432    5/1998

(Continued)

*Primary Examiner*—Kenneth Vanderpuye
*Assistant Examiner*—Thi Q. Le
(74) *Attorney, Agent, or Firm*—Cha & Reiter, LLC

(57) ABSTRACT

A self-healing passive optical network is disclosed. The network includes a central office and a remote node connected to the central office through a main optical fiber. The remote node transmits one portion of power of the upstream optical signal, which has been input from each of the optical network units, to the central office, and returning a remaining portion of the power of the upstream optical signal to the optical network unit. The network also includes a plurality of optical network units connected to the remote node through a plurality of distribution optical fibers. Each of the optical network units transmits an upstream optical signal to the remote node through the directly connected distribution optical fiber, and detects abnormality occurrences from a state of the upstream optical signal returning from the remote node.

11 Claims, 4 Drawing Sheets

U.S. PATENT DOCUMENTS

| | | | | |
|---|---|---|---|---|
| 2003/0063843 A1* | 4/2003 | Horne | ............................ | 385/24 |
| 2004/0033076 A1* | 2/2004 | Song et al. | ..................... | 398/70 |
| 2004/0033077 A1* | 2/2004 | Kim et al. | ...................... | 398/72 |
| 2004/0067059 A1* | 4/2004 | Song et al. | ..................... | 398/82 |
| 2004/0208537 A1* | 10/2004 | Lee et al. | ....................... | 398/41 |
| 2004/0213256 A1* | 10/2004 | Muys et al. | ............... | 370/395.1 |
| 2005/0031249 A1* | 2/2005 | Wellen | .......................... | 385/16 |

FOREIGN PATENT DOCUMENTS

| | | |
|---|---|---|
| JP | 10-256993 | 9/1998 |
| JP | 2000-304647 | 11/2000 |
| JP | 2002-520946 | 7/2002 |
| JP | 2003-179555 | 6/2003 |

* cited by examiner

SELF-HEALING PASSIVE OPTICAL NETWORK

CLAIM OF PRIORITY

This application claims priority to an application entitled "Self-healing passive optical network," filed in the Korean Intellectual Property Office on Dec. 19, 2003 and assigned Serial No. 2003-93864, the contents of which are hereby incorporated by reference.

BACKGROUND OF THE INVENTION

1. Field of the Invention

The present invention relates to an optical communication network, and more particularly to a passive optical network (PON).

2. Description of the Related Art

Wavelength division multiplexing passive optical networks (hereinafter, referred to as WDM-PON) provide ultra high-speed broadband communication service using specific wavelengths assigned to each subscriber unit. WDM-PONs can ensure the secrecy of communication, can easily accommodate special communication services required from each subscriber unit or enlargement of channel capacity, and can easily increase the number of subscriber units by adding specific wavelengths to be assigned to new subscribers.

However, in spite of the advantages described above, the WDM-PON has not yet been put to practical use. This is because a central office (CO) and a plurality of optical network units (ONUs) in the WDM-PON require both light sources having specific oscillation wavelengths and additional wavelength stabilization circuits for stabilizing the wavelengths of the light sources. This puts a heavy economic burden on the subscribers. In order to construct an economic WDM-PON, some conventional WDM-PON have tried using a fabry-perot laser wavelength-locked with inherent light or a reflective semiconductor optical amplifier as a WDM light source, which allow a spectrum sliced broadband light source to facilitate wavelength management.

Generally, the conventional WDM-PON uses a double star structure in order to minimize the length of optical line. A central office and a remote node (RN) installed at an area adjacent to optical network units are connected to each other through one main optical fiber (MOF). The remote node and each optical network unit are connected to each other through a separate distribution optical fiber (DOF). Multiplexed downstream optical signals are transmitted to the remote node through the main optical fiber. The multiplexed downstream optical signals are demultiplexed by a wavelength division multiplexer installed in the remote node and the demultiplexed signals are transmitted to the optical network units through the distribution optical fibers. The upstream optical signals output from the optical network units are transmitted to the remote node and multiplexed by the wavelength division multiplexer. The multiplexed signal is transmitted to the central office.

In such WDM-PON, large amounts of data are transmitted at high speed through wavelengths assigned to each optical network unit. Accordingly, when an abnormality (such as malfunction or deterioration) of an upstream light source or a downstream light source or an abnormality (such as cut or deterioration) of a main optical fiber or distribution optical fiber occurs, the transmitted data may be lost even if the abnormality only occurs for a short time. Accordingly, such an abnormality must be quickly detected and be corrected.

However, when the direct optical line between the central office and the optical network units is cut, the central office and the optical network units cannot report the existence or absence of abnormality to each other. For this situation, a separate low speed communication line may be provided. However, in order to install the separate low speed communication line the central office and each optical network unit, additional cost is required and investment is required for continuously managing and supervising the separate low speed communication line. In addition, in order for the central office and each optical network unit to communicate with each other and check the existence or absence of abnormality through the separate low speed communication line, and to report a manager of the abnormality occurrence, a separated time period is required. As a result, a communication interruption state between the central office and each optical network unit is extended by the time period.

It is also necessary to develop a monitoring method, which can quickly detect an abnormality of an upstream light source or a downstream light source, or an abnormality of a main optical fiber or a distribution optical fiber, and directly report the manager of the existence or absence of abnormality, and a correction method.

The abnormality of the downstream light source or the abnormality of the main optical fiber connecting the central office to the remote node can be monitored by the central office which manages the operation state of the downstream light sources and the received state of all upstream optical signals. For example, when it is assumed that an abnormality does not occur at each distribution optical fiber connecting the remote node to each optical network unit, the state of the upstream light source installed at each optical network unit may be monitored from an upstream optical signal received in an upstream optical receiver installed at the central office. However, when an abnormality occurs at one distribution optical fiber, since the central office cannot receive an upstream optical signal progressing to the distribution optical fiber, the state of the upstream light source cannot be monitored.

Accordingly, in the WDM-PON, a method is required, which can monitor an abnormality of the distribution optical fiber. Further, a monitoring method is required, which can distinguish and recognize an abnormality of the upstream light source and an abnormality of the distribution optical fiber. Furthermore, when an abnormality has occurred at the upstream light source or the distribution optical fiber, a method capable of healing the abnormality is required.

SUMMARY OF THE INVENTION

One aspect of the present invention relates to a passive optical network capable of monitoring an abnormality of a distribution optical fiber.

Another aspect of the present invention relates to a passive optical network capable of distinguishing and recognizing an abnormality of an upstream light source and abnormality of a distribution optical fiber.

Another aspect of the present invention relates to a passive optical network capable of performing self-healing when an abnormality occurs at an upstream light source or a distribution optical fiber.

One embodiment of the present invention it directed to a self-healing passive optical network including a central office and a remote node connected to the central office through a main optical fiber. The remote node transmits one portion of power of the upstream optical signal, which has input from each of the optical network units, to the central office. A remaining portion of the power of the upstream optical signal to the optical network unit is returned. The network also includes a plurality of optical network units connected to the remote node through a plurality of distribution optical fibers, each of the optical network units transmitting an upstream optical signal to the remote node through the directly connected distribution optical fiber, and detecting abnormality occurrence from a state of the upstream optical signal returning from the remote node.

Another embodiment of the present invention is directed to a passive optical network including a central office and a remote node. The remote node including a wavelength division multiplexer and a plurality of optical distributors. The wavelength division multiplexer has a multiplexing port connected to the central office through a main optical fiber and a plurality of demultiplexing ports connected to a plurality of distribution optical fibers. The wavelength division multiplexer multiplexes a plurality of upstream optical signals input to the demultiplexing ports to output the multiplexed signal to the multiplexing port, and the optical distributors disposed on the distribution optical fibers, having multiple pairs of the optical distributors, passing input upstream optical signals when the upstream optical signals have specific wavelengths assigned to the optical distributors, and transmitting the upstream optical signals to other optical distributors when the upstream optical signals do not have specific wavelengths assigned to the optical distributors. The network also includes a plurality of optical network units connected to the distribution optical fibers, having multiple pairs of the optical network units, and having a first upstream light source for outputting an upstream optical signal and a first optical switch, the first optical switch transmitting the upstream optical signal to a directly connected distribution optical fiber in a normal state. The first optical switch transmits the upstream optical signal through a distribution optical fiber connected to a corresponding optical network wilt when an abnormality occurs at the distribution optical fiber.

Yet another embodiment of the present invention is directed to an optical network unit for an optical network. The unit includes an interface for a distribution optical fiber, an upstream light source for outputting an upstream optical signal and a controller. The optical network units transmits the upstream optical signal via the interface and receives a return signal based upon the upstream optical signal. The control is arranged to detect an abnormality occurrence from a state of the return signal.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. In the following description of the present invention, a detailed description of known functions and configuration incorporated herein will be omitted when it may obscure the subject matter of the present invention.

Figure 1:
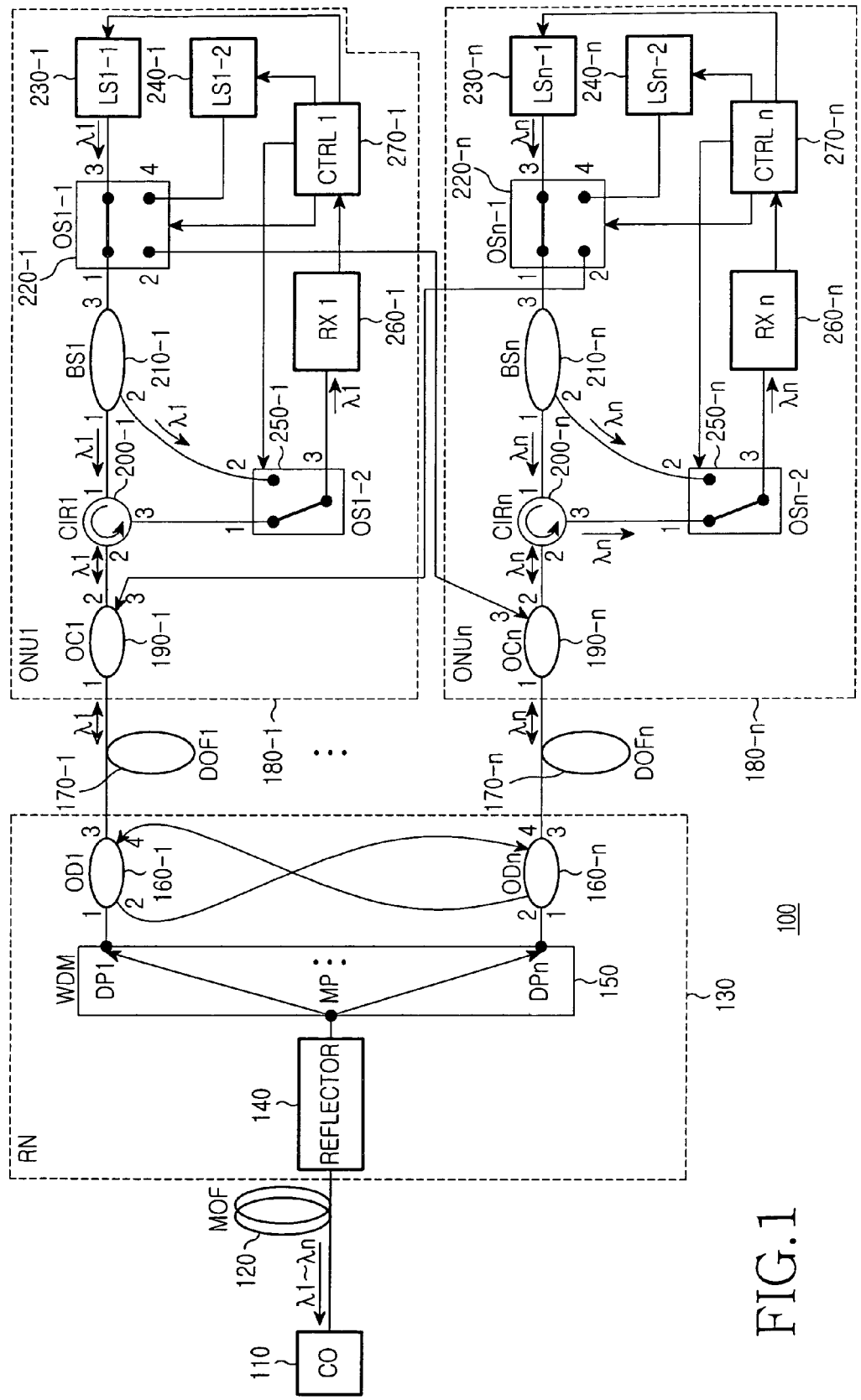
FIG. 1 is a diagram showing the construction of a PON according to one embodiment of the present invention.

FIG. 1 is a diagram showing the construction of a PON according to one embodiment of the present invention. The PON 100 includes a central office 110, a remote node 130 connected to the central office 110 through an main optical fiber 120, and a first to an $n^{th}$ optical network unit 180-1 to 180-n connected to the remote node 130 through a first to an $n^{th}$ distribution optical fiber 170-1 to 170-n.

The central office 110 receives multiplexed upstream optical signals through the main optical fiber 120.

The remote node 130 is connected to the central office 110 through the main optical fiber 120 and includes a reflector 140, a wavelength division multiplexer (WDM) 150, and a first to an $n^{th}$ optical distributor (OD) 160-1 to 160-n.

The reflector 140 has one end connected to the main optical fiber 120 and other end connected to a multiplexing port (MP) of the wavelength division multiplexer 150. The reflector 140 receives upstream optical signals multiplexed by the wavelength division multiplexer 150, partially transmits the power of the multiplexed upstream optical signals, and partially reflects the power of the multiplexed upstream optical signals to the wavelength division multiplexer 150. The reflector 140 may also include a multi-layer thin film filter having a predetermined reflection factor in a predetermined wavelength range, at least one fiber Bragg grating (FBG), or a mirror.

The wavelength division multiplexer 150 has the multiplexing port and a first to an $n^{th}$ demultiplexing port (DP). The multiplexing port is connected to the reflector 140, and the first to the $n^{th}$ demultiplexing port are respectively connected to the first to the $n^{th}$ optical distributor 160-1 to 160-n in a one-to-one fashion. The wavelength division multiplexer 150 multiplexes a first to an $n^{th}$ upstream optical signal input to the first to the $n^{th}$ demultiplexing port to output the multiplexed signal to the multiplexing port. The wavelength division multiplexer 150 may also include an arrayed waveguides grating (AWG).

The first to the $n^{th}$ optical distributor 160-1 to 160-n each have a first to a fourth port. The first port is connected to a corresponding demultiplexing port. The second port is connected to a fourth port of a corresponding optical distributor. The third port is connected to a corresponding distribution optical fiber. The fourth port is connected to a second port of a corresponding optical distributor.

In FIG. 1, an $X^{th}$ optical distributor corresponds to an $(n+1-X)^{th}$ optical distributor, where, $1 \leq X \leq (n/2)$, n and X are natural numbers. For example, the first optical distributor 160-1 corresponds to the $n^{th}$ optical distributor 160-n, the second optical distributor 160-2 corresponds to the $(n-1)^{th}$ optical distributor 160-(n-1), and the third optical distributor 160-3 corresponds to the $(n-2)^{th}$ optical distributor 160-(n-2).

In another embodiment, a correspondence method between two optical distributors may be optionally selected. For example, two optical distributors adjacent to each other may correspond. The first optical distributor 160-1 corresponds to the second optical distributor 160-2, and the third optical distributor 160-3 corresponds to the fourth optical distributor 160-4.

Each of the first to the $n^{th}$ optical distributor 160-1 to 160-n has a specific wavelength. When a wavelength of an upstream optical signal input to the third port coincides with the specific wavelength, the upstream optical signal is output to the first port. Otherwise, the upstream optical signal is output to the second port. In this way, the $n^{th}$ optical distributor 160-n outputs the $n^{th}$ upstream optical signal input to the third port to the first port, and outputs the first upstream optical signal input to the third port to the first port. Further, each of the first to the $n^{th}$ optical distributor 160-1 to 160-n outputs an upstream optical signal input to the first port to the third port. The $n^{th}$ optical distributor 160-n outputs the $n^{th}$ upstream optical signal input to the first port to the third port.

The first to the $n^{th}$ optical network unit 180-1 to 180-n are connected to the remote node 130 through the first to the $n^{th}$ distribution optical fiber 170-1 to 170-n. The $n^{th}$ optical network unit 180-n includes an $n^{th}$ optical coupler (OC) 190-n, an $n^{th}$ circulator (CIR) 200-n, a $(n-1)^{th}$ and a $(n-2)^{th}$ optical switch (OS) 220-n and 250-n, an $n^{th}$ optical receiver (RX) 260-n, an $n^{th}$ beam splitter (BS) 260-n, a $(n-1)^{th}$ and a $(n-2)^{th}$ upstream light source (LS) 230-n and 240-n, and an $n^{th}$ controller (CTRL) 270-n. An $X^{th}$ optical network unit corresponds to a (n+1−X)th optical network unit. Since the first to the $n^{th}$ optical network unit 180-1 to 180-n have the same constructions, the first optical network unit 180-1 will be representatively described hereinafter.

A $(1-1)^{th}$ upstream light source and a $(1-2)^{th}$ upstream light source 230-1 and 240-1 each output a first upstream optical signal under the control of a first controller 270-1. The $(1-2)^{th}$ upstream light source 240-1 is a reserved light source and operates when an abnormality occurs at the $(1-1)^{th}$ upstream light source 230-1.

A $(1-1)^{th}$ optical switch 220-1 has a first to a fourth port. The first port is connected to a first beam splitter 210-1. The second port is connected to the $n^{th}$ optical coupler 190-n of the $n^{th}$ optical network unit 180-n. The third port is connected to the $(1-1)^{th}$ upstream light source 230-1. The fourth port is connected to the $(1-2)^{th}$ upstream light source 240-1. The $(1-1)^{th}$ optical switch 220-1 connects the first port to the third port in a normal state under the control of a first controller 270-1, connects the first port to the fourth port when an abnormality occurs at the $(1-1)^{th}$ upstream light source 230-1, and connects the second port to the third port when an abnormality occurs at the first distribution optical fiber 170-1.

The first beam splitter 210-1 has a first to a third port. The first port is connected to a first circulator 200-1. The second port is connected to a $(1-2)^{th}$ optical switch 250-1. The third port is connected to the first port of the $(1-1)^{th}$ optical switch 220-1. The first beam splitter 210-1 splits the power of the first upstream optical signal, which is input to the third port, at a predetermined proportion, outputs one portion of the split power to the first port, and outputs the other portion of the split power to the second port.

The first circulator 200-1 has a first to a third port. The first port is connected to the first port of the first beam splitter 210-1. The second port is connected to a first optical coupler 190-1. The third port is connected to the $(1-2)^{th}$ optical switch 250-1. The first circulator 200-1 outputs the first upstream optical signal input to the first port to the second port, and outputs the first upstream optical signal input to the second port to the third port.

The $(1-2)^{th}$ optical switch 250-1 has a first to a third port. The first port is connected to the third port of the first circulator 200-1. The second port is connected to the second port of the first beam splitter 210-1. The third port is connected to a first optical receiver 260-1. The $(1-2)^{th}$ optical switch 250-1 connects the first port to the third port in a normal state under the control of the first controller 270-1, and connects the second port to the third port when an abnormality occurs.

The first optical receiver 260-1 is connected to the third port of the $(1-2)^{th}$ optical switch 250-1, and converts the received first upstream optical signal into an electrical signal which will be output.

The first controller 270-1 detects that an abnormality has occurred at the first distribution optical fiber 170-1 or the $(1-1)^{th}$ upstream light source 230-1 according to the state of the electrical signal (abnormality occurrence detection stage), and performs an abnormality position determination stage, an optical line switching stage, or a light source changing stage.

The operation of the PON 100 in a normal state will now be described with reference to FIG. 1.

In the normal state, the first port of the $(1-1)^{th}$ optical switch 220-1 is connected to the third port of the $(1-1)^{th}$ optical switch 220-1, and the first port of the $(1-2)^{th}$ optical switch 250-1 is connected to the third port of the $(1-2)^{th}$ optical switch 250-1. The first upstream optical signal output from the $(1-1)^{th}$ upstream light source 230-1 passes through the $(1-1)^{th}$ optical switch 220-1 and is input to the first beam splitter 210-1.

The first beam splitter 210-1 splits the power of the first upstream optical signal, outputs one portion of the split power to the first port, and outputs the other portion of the split power to the second port. The first upstream optical signal outputted from the second port of the first beam splitter 210-1 is input to the second port of the $(1-2)^{th}$ optical switch 250-1 and then disappears. The first upstream optical signal output from the first port of the first beam splitter 210-1 is input to the first port of the first circulator 200-1 and is output to the second port. The first upstream optical signal then passes through the first optical coupler 190-1, the first distribution optical fiber 170-1, and the first optical distributor 160-1 and is input to the first demultiplexing port of the wavelength division multiplexer 150.

The wavelength division multiplexer 150 multiplexes the first upstream optical signal and the second to the $n^{th}$ upstream optical signal input to the second to the $n^{th}$ demultiplexing port, and outputs the multiplexed upstream optical signals to the multiplexing port. The power of the multiplexed upstream optical signals is split by the reflection of the reflector 140, one portion of the split power passes through the reflector 140 and is transmitted to the central office 110 through the main optical fiber 120. The other portion of the split power is input to the multiplexing port of the wavelength division multiplexer 150. The wavelength division multiplexer 150 demultiplexes the multiplexed upstream optical signals, which are input to the multiplexing port, according to wavelengths to output the demultiplexed signals the first to the $n^{th}$ demultiplexing port.

The first upstream optical signal output from the first demultiplexing port passes through the first optical distributor 160-1, the first distribution optical fiber 170-1, and the first optical coupler 190-1, is input to the second port of the first circulator 200-1 and is output to the third port. The first upstream optical signal output from the third port of the first circulator 200-1 is input to the first port of the $(1-2)^{th}$ optical switch 250-1, is output to the third port, and is input to the first optical receiver 260-1. The first optical receiver 260-1 converts the input first upstream optical signal into an electrical signal which will be output. Since the input electrical signal is in a normal state, the first controller 270-1 determines that the first distribution optical fiber 170-1 or the $(1-1)^{th}$ upstream light source 230-1 is in a normal state.

Abnormality Occurrence Detection Stage

The first controller 270-1 detects that an abnormality has occurred at the first distribution optical fiber 170-1 or the $(1-1)^{th}$ upstream light source 230-1 when the input electrical signal is in an abnormal state (e.g., rapid reduction of power or intermittent interruption of a signal), or an electrical signal is not input.

Abnormality Position Determination Stage

Figure 2:
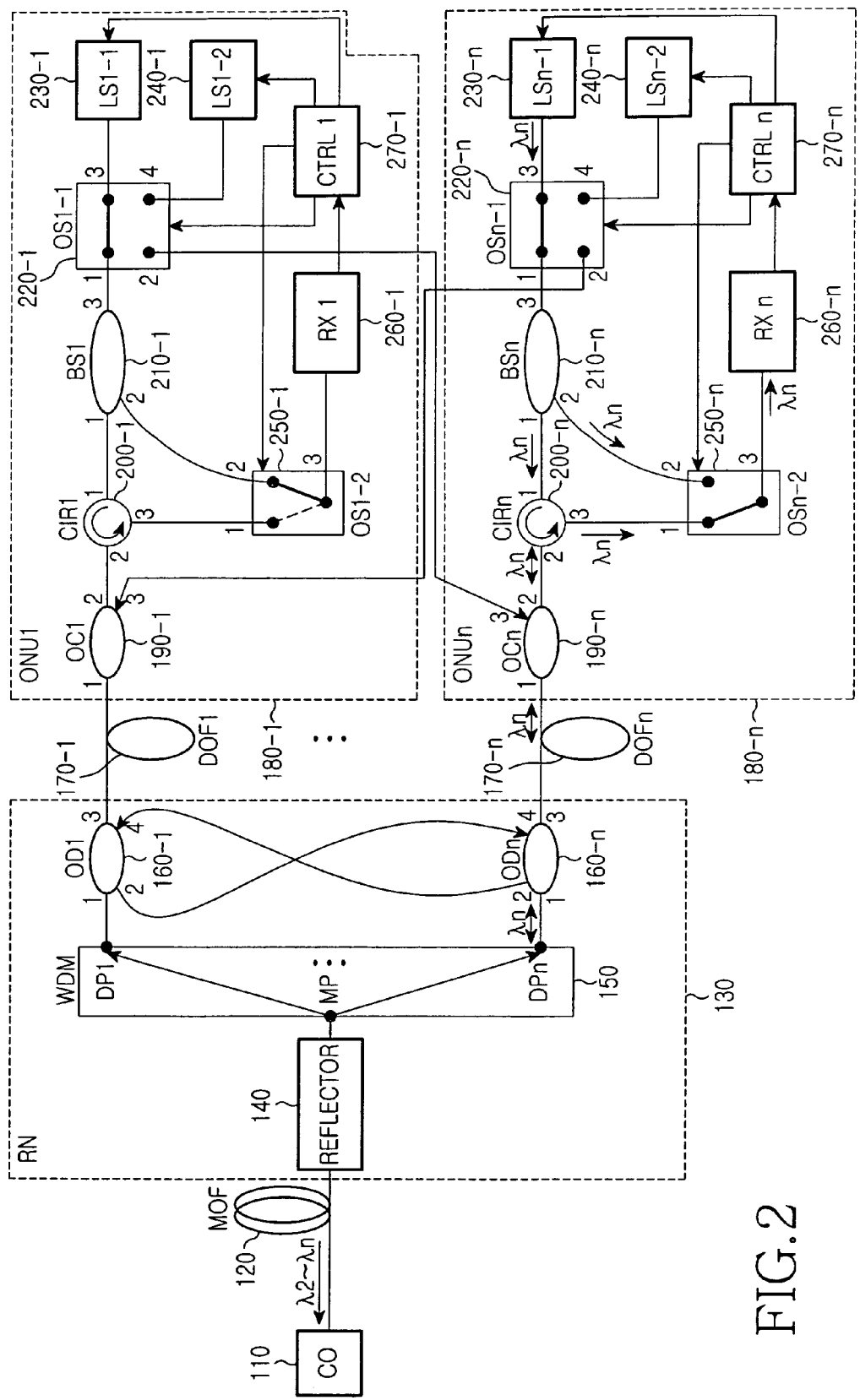
FIG. 2 is a block diagram illustrating an abnormality position determination process in the PON shown in FIG. 1.

FIG. 2 is a block diagram illustrating an abnormality position determination process in the PON shown in FIG. 1. Hereinafter, a process in which the first controller 270-1 determines an abnormality position when the abnormality has occurred at the first distribution optical fiber 170-1 or the $(1-1)^{th}$ upstream light source 230-1 will be described with reference to FIG. 2.

The first controller 270-1 detects that the abnormality has occurred and controls the second port of the $(1-2)^{th}$ optical switch 250-1 to be connected to the third port of the $(1-1)^{th}$ optical switch 250-1. When the input electrical signal is in a normal state, the first controller 270-1 determines that the abnormality has occurred at the first distribution optical fiber 170-1. When the input electrical signal is in an abnormal state or an electrical signal is not input, the first controller 270-1 determines that the abnormality has occurred at the $(1-1)^{th}$ upstream light source 230-1.

When the abnormality has occurred at the first distribution optical fiber 170-1, the first controller 270-1 performs the optical line switching process which will be described below. When the abnormality has occurred at the $(1-1)^{th}$ upstream light source 230-1, the first controller 270-1 performs the light source changing process which will be described below.

Optical Line Switching Stage

Figure 3:
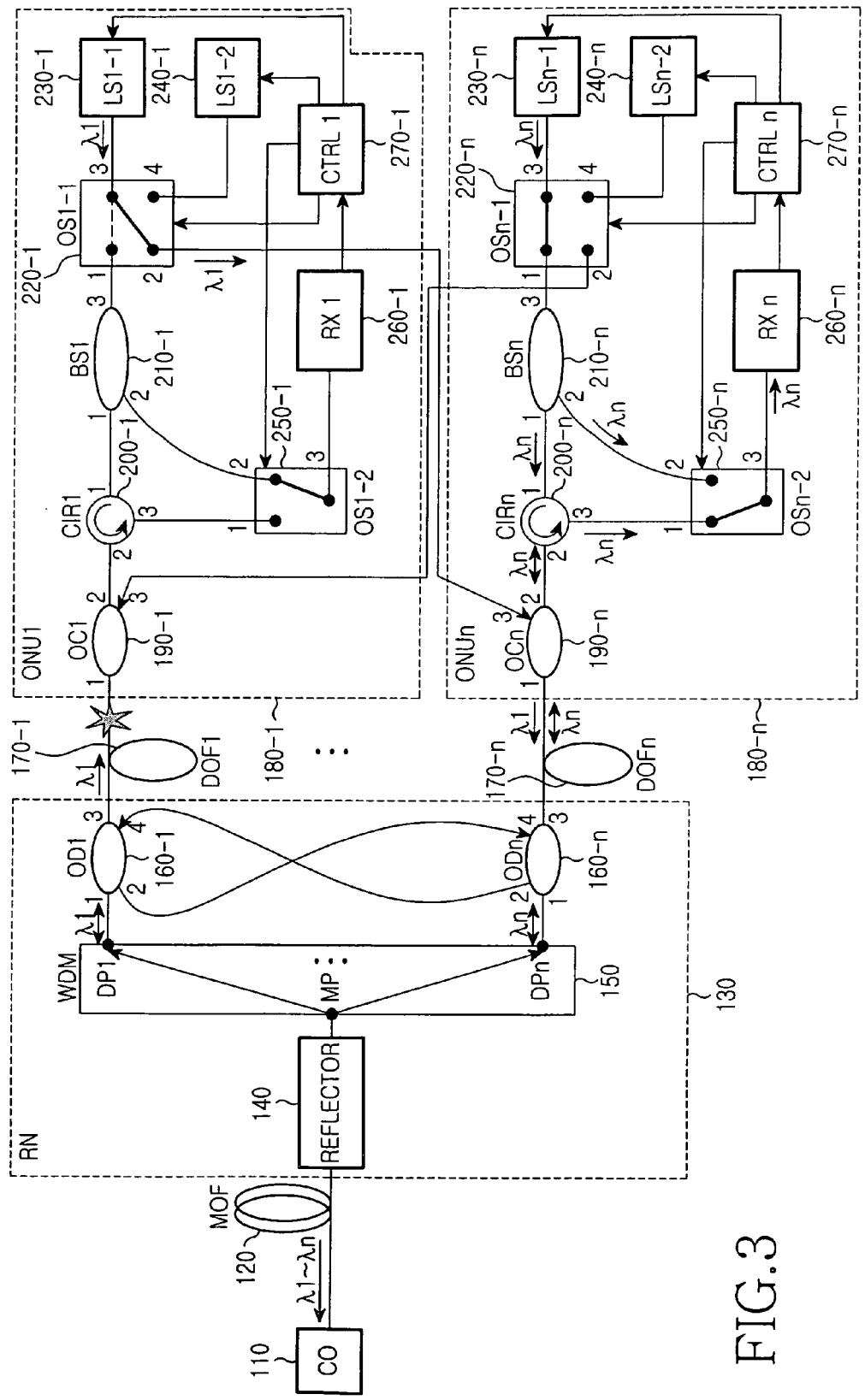
FIG. 3 is a block diagram illustrating an optical line switching process in the PON shown in FIG. 1.

FIG. 3 is a block diagram illustrating an optical line switching process in the PON shown in FIG. 1. Hereinafter, a process in which the first controller 270-1 switches the optical line when the abnormality has occurred at the first distribution optical fiber 170-1 will be described with reference to FIG. 3.

The first controller 270-1 detects that the abnormality has occurred at the first distribution optical fiber 170-1 and controls the second port of the $(1-1)^{th}$ optical switch 220-1 to be connected to the third port of the $(1-1)^{th}$ optical switch 220-1.

The first upstream optical signal output from the $(1-1)^{th}$ upstream light source 230-1 passes through the $(1-1)^{th}$ optical switch 220-1, is input to the third port of the $n^{th}$ optical coupler 190-n, and is output to the first port thereof. The first upstream optical signal output from the first port of the $n^{th}$ optical coupler 190-n passes through the $n^{th}$ distribution optical fiber 170-n, is input to the third port of the $n^{th}$ optical distributor 160-n, and is output to the second port thereof. The second port of the $n^{th}$ optical distributor 160-n is connected to the fourth port of the first optical distributor 160-1, and the first optical distributor 160-1 outputs the first upstream optical signal input to the fourth port to the first port. The first upstream optical signal output from the first port of the first optical distributor 160-1 is input to the first demultiplexing port of the wavelength division multiplexer 150.

The wavelength division multiplexer 150 multiplexes the first upstream optical signal and the second to the $n^{th}$ upstream optical signal input to the second to the $n^{th}$ demultiplexing port, and outputs the multiplexed upstream optical signals to the multiplexing port. The power of the multiplexed upstream optical signals is split by the reflection of the reflector 140. One portion of the split power passes through the reflector 140 and is transmitted to the central office 110 through the main optical fiber 120. The other portion of the split power is input to the multiplexing port of the wavelength division multiplexer 150.

Light Source Changing Stage

Figure 4:
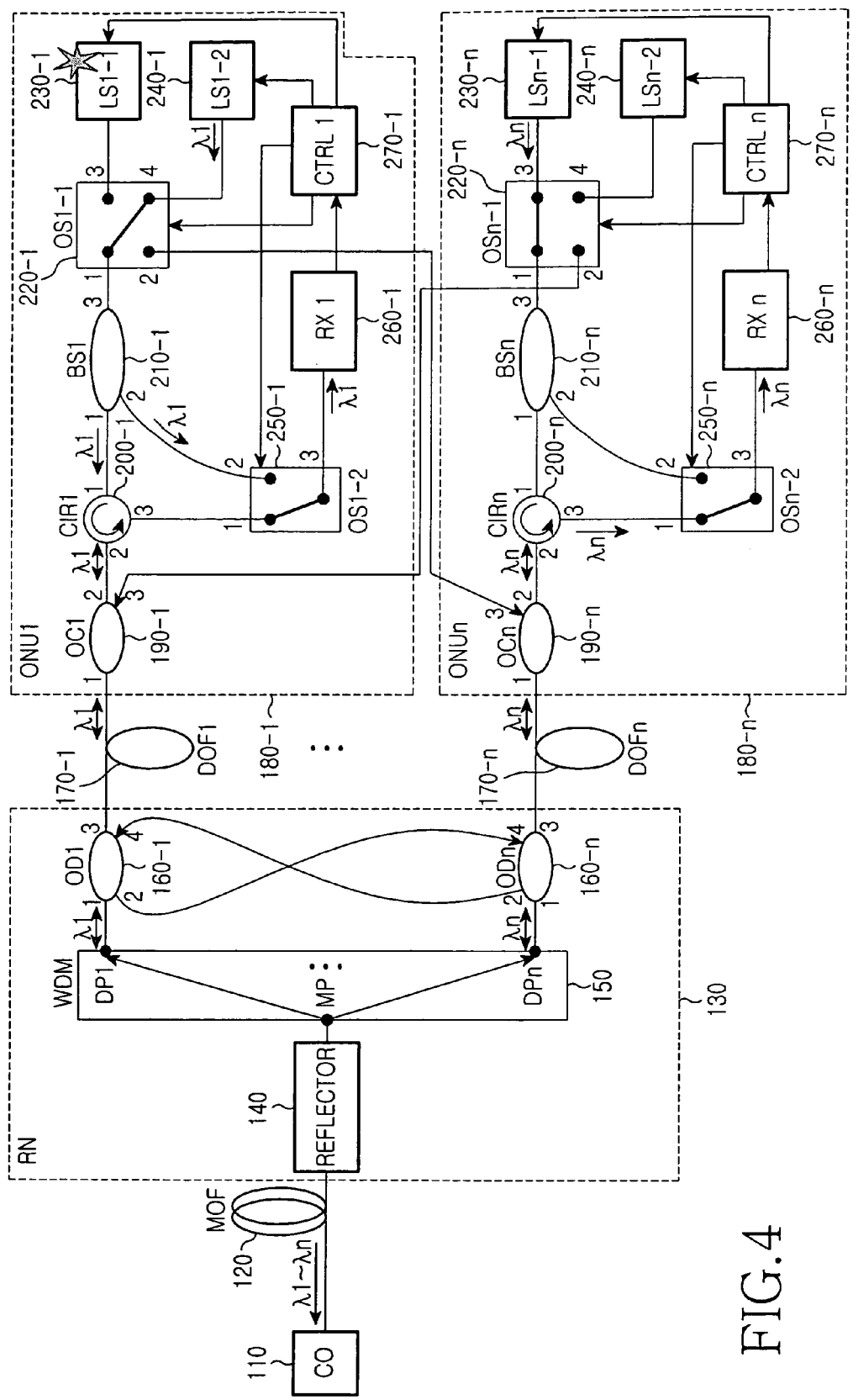
FIG. 4 is a block diagram illustrating a light source changing process in the PON shown in FIG. 1.

FIG. 4 is a block diagram illustrating a light source changing process in the PON shown in FIG. 1. Hereinafter, a process in which the first controller 270-1 replaces the $(1-1)^{th}$ upstream light source 230-1 with the $(1-2)^{th}$ upstream light source 240-1 when the abnormality has occurred at the $(1-1)^{th}$ upstream light source 230-1 will be described with reference to FIG. 4.

The first controller 270-1 detects that the abnormality has occurred at the $(1-1)^{th}$ upstream light source 230-1 and controls the first port of the $(1-1)^{th}$ optical switch 220-1 to be connected to the fourth port of the $(1-1)^{th}$ optical switch 220-1, controls the first port of the $(1-2)^{th}$ optical switch 250-1 to be connected to the third port of the $(1-1)^{th}$ optical switch 250-1, and operates the $(1-2)^{th}$ upstream light source 240-1.

The first upstream optical signal output from the $(1-2)^{th}$ upstream light source 240-1 passes through the $(1-1)^{th}$ optical switch 220-1, and is input to the first beam splitter 210-1. The first beam splitter 210-1 splits the power of the first upstream optical signal, outputs one portion of the split power to the first port thereof, and outputs the other portion of the split power to the second port thereof. The first upstream optical signal output from the second port of the first beam splitter 210-1 is input to the second port of the $(1-2)^{th}$ optical switch 250-1 and then disappears. The first upstream optical signal output from the first port of the first beam splitter 210-1 is input to the first port of the first circulator 200-1 and is output to the second port thereof. The first upstream optical signal then passes through the first optical coupler 190-1, the first distribution optical fiber 170-1, and the first optical distributor 160-1 and is input to the first demultiplexing port of the wavelength division multiplexer 150.

The wavelength division multiplexer 150 multiplexes the first upstream optical signal and the second to the $n^{th}$ upstream optical signal input to the second to the $n^{th}$ demultiplexing port, and outputs the multiplexed upstream optical signals to the multiplexing port. The power of the multiplexed upstream optical signals is split by the reflection of the reflector 140. One portion of the split power passes through the reflector 140 and is transmitted to the central office 110 through the main optical fiber 120. The other portion of the split power is input to the multiplexing port of the wavelength division multiplexer 150. The wavelength division multiplexer 150 demultiplexes the multiplexed upstream optical signals, which are input to the multiplexing port, according to wavelengths to output the demultiplexed signals the first to the $n^{th}$ demultiplexing port. The first upstream optical signal output from the first demultiplexing port passes through the first optical distributor 160-1, the first distribution optical fiber 170-1, and the first optical coupler 190-1, is input to the second port of the first circulator 200-1 and is output to the third port thereof. The first upstream optical signal output from the third port of the first circulator 200-1 is input to the first port of the $(1-2)^{th}$ optical switch 250-1, is output to the third port thereof, and is input to the first optical receiver 260-1.

The first optical receiver 260-1 converts the input upstream optical signal into an electrical signal which will be output. Since the input electrical signal is in a normal state, the first controller 270-1 determines that the light source changing process has been normally performed.

As described above, abnormality occurrence is detected from a state of a returning upstream optical signal, so that the abnormality occurrence can be quickly detected and instantly processed.

In addition, a state of a distribution optical fiber and a state of an upstream light source located at an optical network unit are respectively monitored. Self-healing can then be performed when an abnormality occurs at the distribution optical fiber or the upstream light source. Therefore, the distribution optical fiber and the upstream light source can be economically and efficiently managed and healed.

While the invention has been shown and described with reference to certain embodiments thereof, it will be understood by those skilled in the art that various changes in form and details may be made therein without departing from the spirit and scope of the invention as defined by the appended claims.

What is claimed is:

1. A passive optical network comprising:
    a central office;
    a plurality of optical network units, each of the optical network unit including: a first upstream light source for outputting an upstream optical signal; a circulator having a first to a third port, for outputting the upstream optical signal input to the first port to the second port connected to a distribution optical fiber, for outputting the returning upstream optical signal input to the second port to the third port; an optical receiver for receiving the upstream optical signal output from the third port of the circulator, and converting the received upstream optical signal into an electrical signal to be output; a second upstream light source for outputting an upstream optical signal; and a first switch for connecting the first upstream light source to the circulator in a normal state, for connecting the circulator to the second upstream light source when an abnormality has occurred at the first upstream light source;
    a remote node connected to the central office through a main optical fiber, the remote node transmitting one portion of power of the upstream optical signal, which has input from each of the optical network units, to the central office, and returning a remaining portion of the power of the upstream optical signal to the optical network unit; and
    a plurality of distribution optical fibers connecting the plurality of optical network units to the remote node,
    wherein each of the optical network units transmitting the upstream optical signal to the remote node through a corresponding distribution optical fiber, and detecting abnormality occurrence from a state of the upstream optical signal returning from the remote node.

2. The passive optical network as claimed in claim 1, wherein the remote node includes:
    a wavelength division multiplexer for multiplexing and outputting a plurality of upstream optical signals input from the distribution optical fibers, demultiplexing returning multiplexed upstream optical signals, and transmitting the demultiplexed optical signals to the distribution optical fibers; and
    a reflector having a first end connected to the main optical fiber and a second end connected to the wavelength division multiplexer, for passing one portion of power of the multiplexed upstream optical signals input from the wavelength division multiplexer, and for returning a remaining portion of the power of the multiplexed upstream optical signals to the wavelength division multiplexer.

3. The passive optical network as claimed in claim 1, wherein each of the optical network units further includes:
    a beam splitter for splitting the portion of power of the upstream optical signal; and
    a second switch for providing the optical receiver with one portion of the split power in order to check whether or not an abnormality occurs at the first upstream light source.

4. A passive optical network comprising:
    a central office;
    a remote node including a wavelength division multiplexer and a plurality of optical distributors, the wavelength division multiplexer having a multiplexing port connected to the central office through a main optical fiber and a plurality of demultiplexing ports connected to a plurality of distribution optical fibers, the wavelength division multiplexer multiplexing a plurality of upstream optical signals input to the demultiplexing ports to output the multiplexed signal to the multiplexing port, and the optical distributors disposed on the distribution optical fibers, having multiple pairs of the optical distributors, passing input upstream optical signals when the upstream optical signals have specific wavelengths assigned to the optical distributors, and transmitting the upstream optical signals to other optical distributors when the upstream optical signals do not have specific wavelengths assigned to the optical distributors; and
    a plurality of optical network units connected to the distribution optical fibers, having multiple pairs of the optical network units, and having a first upstream light source for outputting an upstream optical signal and a first optical switch, the first optical switch transmitting the upstream optical signal to a directly connected distribution optical fiber in a normal state, and the first optical switch transmitting the upstream optical signal through a distribution optical fiber connected to a corresponding optical network unit when an abnormality occurs at the distribution optical fiber.

5. The passive optical network as claimed in claim 4, wherein the remote node further includes a reflector and each of the optical network units detects abnormality occurrence from a state of the upstream optical signal returning from the remote node, the reflector having a first end connected to the main optical fiber and a second end connected to the wavelength division multiplexer, passing one portion of power of the multiplexed upstream optical signals inputted from the wavelength division multiplexer, and returning a remaining portion of the power of the multiplexed upstream optical signals to the wavelength division multiplexer.

6. The passive optical network as claimed in claim 5, wherein each optical network unit further includes a circulator and an optical receiver, wherein:
    the circulator has a first to third port, outputs the upstream optical signal inputted to the first port to the second port connected to the distribution optical fiber, and outputs the returning upstream optical signal inputted to the second port to the third port, and
    the optical receiver receives the upstream optical signal outputted from the third port of the circulator, and converts the received upstream optical signal into an electrical signal to be outputted.

7. The passive optical network as claimed in claim 6, wherein each optical network unit further includes a second upstream light source for outputting an upstream optical signal, and the first switch connects the first upstream light source to the circulator in a normal state, and connects the circulator to the second upstream light source when an abnormality has occurred at the first upstream light source.

8. The passive optical network as claimed in claim 7, wherein each optical network unit further includes:
   an optical splitter for splitting one portion of power of the upstream optical signal; and
   a second switch for providing the optical receiver with one portion of the split power in order to check whether or not an abnormality occurs at the first upstream light source.

9. An optical network unit for an optical network comprising:
   an interface for a distribution optical fiber,
   an upstream light source for outputting an upstream optical signal; and
   a controller,
   a circulator having a first to a third port, for outputting the upstream optical signal input to the first port to the second port connected to the distribution optical fiber, for outputting the returning upstream optical signal input to the second port to the third port;
   an optical receiver for receiving the upstream optical signal output from the third port of the circulator, and converting the received upstream optical signal into an electrical signal to be output;
   second upstream light source for outputting an upstream optical signal;
   a first switch for connecting the first upstream light source to the circulator in a normal state, for connecting the circulator to the second upstream light source when an abnormality has occurred at the first upstream light source;
   a beam splitter for splitting the portion of power of the upstream optical signal; and
   a second switch for providing the optical receiver with one portion of the split power in order to check whether or not an abnormality occurs at the first upstream light source,
   wherein the optical network unit transmits the upstream optical signal via the interface and receives a return signal based upon the upstream optical signal, the controller being arranged to detect an abnormality occurrence from a state of the return signal.

10. The optical network unit as claimed in claim 9, wherein the abnormality occurrence includes a rapid reduction of power of the return signal, an intermittent interruption of the return signal or lack of the return signal.

11. The optical network unit as claimed in claim 9, further comprising:
   a beam splitter for splitting the portion of power of the upstream optical signal; and
   a second switch for providing the optical receiver with one portion of the split power in order to check whether or not an abnormality occurs at the first upstream light source.

* * * * *